United States Patent
Kawata et al.

(10) Patent No.: US 6,696,113 B2
(45) Date of Patent: Feb. 24, 2004

(54) LYOTROPIC LIQUID CRYSTAL COMPOSITION

(75) Inventors: Ken Kawata, Kanagawa (JP); Masahiro Asami, Kanagawa (JP); Hideyuki Nishikawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/109,651

(22) Filed: Apr. 1, 2002

(65) Prior Publication Data

US 2003/0047711 A1 Mar. 13, 2003

(30) Foreign Application Priority Data

Mar. 30, 2001 (JP) .......................... 2001-101745
Mar. 30, 2001 (JP) .......................... 2001-101746
Sep. 6, 2001 (JP) .......................... 2001-270222

(51) Int. Cl.[7] .................. C09K 19/38; C09K 19/02; G02B 5/30
(52) U.S. Cl. .................. 428/1.1; 428/1.2; 428/1.31; 428/1.55; 252/299.01
(58) Field of Search ...................... 252/299.01; 428/1.1, 428/1.2, 1.31, 1.55

(56) References Cited

U.S. PATENT DOCUMENTS 5,096,612 A * 3/1992 Pinter et al. ............ 252/299.01
5,875,014 A * 2/1999 Kuwabara et al. .......... 349/117
6,583,284 B1 * 6/2003 Sidorenko et al. .......... 544/342

OTHER PUBLICATIONS

Caplus 1995: 513308.*
Caplus 1999: 381752.*
Caplus 2002: 776342.*
Caplus 2003: 185292.*
M. Saito et al., "Micropolarizer made of the anodized alumina film", *Appl. Phys. Lett.* 55 (7), Aug. 14, 1989, pp. 607–609.
B. Van Der Zande et al., "Aqueous Gold Sols of RodShaped Particles", *J. Phys. Chem.* B 1997, 101, pp. 852–854.
T. Crowley et al., "Lyotropic chromonic liquid crystals: neutron scattering studies of shear–induced orientation and reorientation", *Colloids and Surfaces A: Physicochemical and Engineering Aspects* 129–130 (1997), pp. 95–115.
Y. Bobrov et al., "Novel Dichroic Polarizing Materials and Approaches to Large–Area Processing", *Mat. Res. Soc. Symp. Proc.*, vol. 508 (1998), pp. 225–228.

* cited by examiner

*Primary Examiner*—Shean C. Wu
(74) *Attorney, Agent, or Firm*—Burns, Doane, Swecker & Mathis, LLP

(57) ABSTRACT

A lyotropic liquid crystal composition comprises silver halide grains, silver grains or optically anisotropic grains dispersed in lyotropic liquid crystal. The grains have an aspect ratio of not less than 2.

22 Claims, No Drawings

LYOTROPIC LIQUID CRYSTAL COMPOSITION

FIELD OF THE INVENTION

The present invention relates to a lyotropic liquid crystal composition comprising silver grains, silver halide grains or optically anisotropic grains dispersed in lyotropic liquid crystal. The invention also relates to an optically anisotropic thin film comprising the grains and the lyotropic liquid crystal. The invention further relates to a process for preparation of the optically anisotropic thin film by use of the lyotropic liquid crystal composition.

BACKGROUND OF THE INVENTION

A diffraction optical device, which is produced on the basis of lithography and etching technology, has been rapidly improved according as the technology has been developed. For example, a diffraction optical device having a pitch shorter than visible wavelength has been studied. Generally, a material having a structure smaller than visible wavelength can be regarded as a homogeneous media having a certain refractive index, which depends on the structure and the refractive index of the material alone. The diffraction device having a fine pitch has an important advantage of controlling polarization. In fact, if the fine structure of the device is not the same in all directions, the device shows optical anisotropy called "structural birefringence". Because of this character, it is theoretically possible to produce a diffraction grating showing controlled polarization. The fine diffraction device has been studied since late 1980s. The studies are described in Kikuta et al, OPTRONICS, 8(1996), 132.

A practically used polarizing element in the above technical field comprises silver grains of football shape dispersed in glass (described in Japanese Patent Publication No. 2(1990)-40619, U.S. Pat. Nos. 4,486,213 and 4,479,819). This device is prepared in the following manner. First, a glass material containing silver and halogen is subjected to heat treatment so as to deposit silver halide grains. The material is then heated and stretched to make the grains football shape, and thereby optical anisotropy is caused in the silver halide grains. Finally, the material is heated under reducing atmosphere to reduce the silver halide into silver metal.

In the thus-prepared device, the silver halide grains do not have uniform aspect ratio (ratio between the lengths of long and short axes). Further, it is difficult to fully reduce the silver halide in the glass, and consequently opaque silver halide slightly remains.

In order to solve these problems, it is proposed to produce a polarizing element through a film-forming process such as vacuum deposition or spattering process (described in Resume for Japan Electronic Information and Communication Society, autumn meeting 1990, C-212). According to the proposed process, first a metal layer is formed by vacuum deposition on a dielectric substrate such as a glass plate. On the formed layer, a dielectric layer such as a glass layer is then formed by, for example, spattering. The procedure is repeated several times to form some metal and dielectric layers piled up alternatively. The formed layered composition is heated and stretched so that the metal layers may be transformed into discontinuous islanded metal particle layers. Since each metal particle in the layers is stretched to transform into football shape, the polarization is realized.

For improving efficiency of light used in a polarizing plate, it is proposed to use a polarizing plate of light-scattering type in place of or in addition to that of light-absorbing type. The polarizing plate of light-scattering type as well as that of light-absorbing type transmits only the light component polarized parallel to the polarizing axis. However, the plate of light-scattering type does not absorb but scatters forward or backward the perpendicularly polarized component, and accordingly it improves the efficiency of light.

The polarizing plate of light-scattering type is described in Japanese Patent Provisional Publication Nos. 8(1996)-76114, 9(1997)-274108, 9(1997)-297204, Japanese Patent Publication Nos. 11(1999)-502036, 11(1999)-509014, U.S. Pat. Nos. 5,783,120, 5,825,543 and 5,867,316.

An anisotropic thin film comprising fine nickel metal rods is reported (Saito et al, Appl. Phys. Lett., 55(1989), No. 7, 607). In preparing the film, a porous alumina thin film is electrochemically formed on a cathode, and then the porosities are filled with nickel metal. The thus-formed film shows such polarizing performance that the extinction ratio is 30 dB at the wavelength of 1.3 $\mu$m.

The optical characteristics of gold colloid have been studied for a long time. For example, a monodispersive colloid of uniform fine gold rods is reported (van der Zande et al, J. Phys. Chem. B, 101(1997), 852). In preparing the colloid, a porous alumina film is formed by anode oxidation (diameter of porosity: 12 nm). In the film, gold rods are grown by electrochemical deposition from a gold solution. The alumina film is then removed to obtain the dispersive fine gold rods. The lengths of the rods are controlled in the range of 12 to 160 nm by the time for deposition. The anisotropy of the gold rods depends on the ratio of length/diameter, and accordingly the spectrum remarkably varies according to the ratio.

Gabor L. Hornyak et al. also adopt the method in which fine porosities are charged with gold to prepare various alumina films containing fine gold rods, and study the optical characters of the films containing anisotropically aligned fine gold rods having various aspect ratios (J. Phys. Chem. B, 101(1997), 1548). As a result, they confirm that Maxwell-Garnet theorem, which is a relation between colloidal particles and plasmon resonance absorption, holds for these fine gold particles.

Kikuta et al. notice an intense dispersion on effective refractive index of structural birefringence based on the above-described fine aligning structure. They suggest that this phenomenon can be utilized to produce a wide-ranging $\lambda/4$ plate (Resume for Japan Appiled Physics Society, autumn meeting 1990, 26a-SP-22, 807).

Giving nonlinear optical effects, the composite material containing dispersed structural units of nanometer size (e.g., metal particles, semiconductor crystallites) has been studied to use in the field of nonlinear optics.

The term "nonlinear optical effects" means the following phenomena. When a ray having the electric field E and the frequency $\omega$ comes into the material, the electric field (E) induces alternative separation between positive and negative electric charge at the frequency $\omega$. This alternative charge separation is called "polarization wave". The polarization wave then functions as a wave source to cause a ray of the frequency $\omega$, which comes out of the material. Consequently, the incident ray and the ray coming out have the same frequency. This is a normal interaction between light and matter. However, in some materials, when the incident ray having the electric field (E) and the frequency ω comes, another polarization wave is induced in proportion to the power of E. These materials are called "nonlinear optical materials". The nonlinear optical material gives peculiar phenomena. For example, the ray coming out of the material has a frequency of twice or more as large as the incident frequency ω (namely, the color of the ray coming out is different from that of the incident ray). Further, the refractive index of the material varies according to the square of the intensity of light (electric field). These peculiar phenomena are generally called "nonlinear optical effects". The nonlinear optical effects have been studied in view of application to wavelength conversion of lasers or optical logic devices. There is a close relation between the nonlinear optical effects and the quantum confinement. In fact, if a material comprises fine metal or semiconductor particles of nanometer size, the quanta (such as electrons, positive holes and excitons) concerned with the interaction between light and matter cannot freely behave and consequently induce the peculiar phenomena that are not observed in a normal bulk state. In this way, the quantum confinement is known to cause the intense nonlinear optical effects, and therefore media containing dispersed fine particles or materials having fine structural units of nanometer size have been noticed and studied to use as nonlinear optical materials.

For example, a nonlinear optical composite material containing dispersed particles of nanometer size is disclosed in NEW GLASS, 3(1989), No. 4, pp. 41. For producing the material, glass and particle material of nanometer size are melted and mixed, and then the mixture is subjected to heat treatment at a proper temperature to deposit the particles in the glass. Another nonlinear optical composite material containing dispersed particles of nanometer size is disclosed in Hikari Gijutsu Contact (written in Japanese), 27(1989), No. 7, pp. 389. For producing the material, glass and particles of nanometer size are simultaneously deposited on a substrate so that the particles may be dispersed in a thin film of glass, and the film is then subjected to heat treatment.

There are some publications reporting that lyotropic liquid crystal molecules themselves are aligned when they are sheared. Gudrun Schmidt et al. report that amphiphilic molecules of $C_{12}H_{25}(OC_2H_4)_6OH$, which serves as a non-ionic surface-active agent, are aligned along the flow direction (Journal of Physical Chemistry B, 102(1998), 507). Quist et al. report that amphiphilic molecules of sodium dodecybenzenesulfonate, which serves as an anionic surface-active agent, are aligned to form a lamellar structure (Liquid Crystals, 16(1994), 235).

According to Stefan Muller et al. (Langmuir, 15(1999), 7558), if the shearing speed is relatively low the molecules of $C_{12}H_{25}(OC_2H_4)_4OH$ are aligned to form a lamellar phase so that the normal of the phase may be parallel to the velocity gradient. On the other hand, in middle or more velocity range of the shearing speed, the molecules form a multi lamellar vesicle.

There are some attempts to align aqua-soluble dye molecules in a certain direction. These attempts are made with the aim of using the dye for a polarizing membrane. For example, Japanese Patent Provisional Publication No. 10(1998)-333154 (Ichimura et al.) describes an experiment about aligned dye molecules. In the experiment, first poly (4-methacryloylazobenzene) is spin-coated and exposed to light so as to align the molecules to form an orientation layer. An aqueous solution of Direct Blue 67 is then cast on the orientation layer. According to the publication, the dye molecules are aligned vertically to the optical axis of the applied rays. Croeley et al. (Colloid and Surfaces A, 129–130(1997), 95) report that azo dye molecules, which form a hexagonal phase in aqueous solution, are aligned highly in order along the flow direction at a low shearing speed (2.78/s). Further, they also report that cyanine dye molecules are aligned to form a lamellar phase so that the normal of the phase may be parallel to the velocity gradient.

It is also reported that a lyotropic liquid crystal aqueous solution comprising discotic dye molecules of surface-active agent type is coated so that the molecules may be shared and aligned so as to form a polarizing membrane. Bobrov et al. (Mat. Res. Soc. Symp. Proc., 508(1998), 225) coat and share an aqueous solution of anthraquinone dye containing some additives (e.g., Trition-X-100, hydroquinone, polyethylene glycol) to produce a blue liquid crystal membrane giving polarization of 95%. They also produce a gray polarizing membrane from the solution containing some kinds of discotic dye molecules.

In the above-described studies, lyotropic liquid crystal molecules are shared and aligned in a host/guest structure. The structure is constituted of the lyotropic liquid crystal molecules alone or a combination of the liquid crystal molecules as the host and other organic molecules as the guest. However, it is unknown that, in order to induce anisotropy, the lyotropic liquid crystal molecules are shared and aligned in a host/guest structure in which anisotropic inorganic, organic or inorganic/organic composite material of micro- or nano-meter size are contained as the guest.

In a media containing dispersed fine structural units of nanometer size (e.g., fine particles), each unit must enhance each other's nonlinear optical effect to give both intense nonlinear optical effects and effective optical anisotropy.

However, in the above-described known composite materials containing dispersed particles of nanometer size, the orderliness of the aligned particles is too low. Further, it is almost impossible to produce a device of the material having a large surface through a simple process.

Furthermore, there are some practical problems in the producing process. Since most inorganic or composite particles generally have large surface energy, they are liable to aggregate when they are taken from a mold in the production process. It is, therefore, very difficult to clearly separate the rod-like or tabular particles from the mold. Generally, it is not easy to handle the fine particles of micro- or nano-meter size in the same manner as normal fine powder. Further, it is difficult to evenly disperse and coat the particles and hence to prepare a stable dispersion.

SUMMARY OF THE INVENTION

The applicants have studied a method by which an isotropic or anisotropic media in which anisotropic materials of nanometer size are stably formed in the presence of the lyotropic liquid crystal can be easily separated and removed from the liquid crystal and the materials. As a result, the applicants have finally achieved the present invention. In the invention, rod-like or tabular grains (silver grains, silver halide grains or optically anisotropic grains) are stably formed and dispersed in protective colloid of gelatin. The silver halide grains or the silver grains and lyotropic liquid crystal are mixed, and the protective colloid (gelatin) is decomposed with enzyme to prepare a composition. In the prepared composition, the rod-like or tabular silver halide grains or reduced silver grains thereof are stably dispersed in the lyotropic liquid crystal. The composition is coated so that the grains may be shared and anisotropically aligned, and thereby an optically anisotropic material is easily produced.

An object of the present invention is to form an optically anisotropic thin film from a stable lyotropic liquid crystal composition.

The present invention provides a lyotropic liquid crystal composition comprising silver halide grains or silver grains dispersed in lyotropic liquid crystal, said grains having an aspect ratio of not less than 2.

The lyotropic liquid crystal composition can be prepared by a process which comprises the steps of: precipitating silver halide grains from a silver halide emulsion by centrifugation; dispersing again the silver halide grains in water; adding lyotropic liquid crystal into the dispersion; and removing remaining gelatin with an enzyme.

The invention also provides an optically anisotropic thin film comprising lyotropic liquid crystal molecules and silver halide grains or silver grains, said grains having an aspect ratio of not less than 2, wherein the lyotropic liquid crystal molecules and said grains are aligned.

The optically anisotropic thin film can be prepared by a process which comprises coating a lyotropic liquid crystal composition comprising silver halide grains or silver grains dispersed in lyotropic liquid crystal on a support to align the lyotropic liquid crystal and the grains by shearing force applied in a coating procedure, said grains having an aspect ratios of not less than 2.

The invention further provides a lyotropic liquid crystal composition comprising optically anisotropic grains dispersed in lyotropic liquid crystal, said grains having an aspect ratio of not less than 2.

The invention furthermore provides an optically anisotropic thin film comprising lyotropic liquid crystal molecules and optically anisotropic grains, said grains having an aspect ratio of not less than 2, wherein the lyotropic liquid crystal molecules and said grains are aligned.

The optically anisotropic thin film can be prepared by a process which comprises coating a lyotropic liquid crystal composition comprising optically anisotropic grains dispersed in lyotropic liquid crystal on a support to align the lyotropic liquid crystal and the grains by shearing force applied in a coating procedure, said grains having an aspect ratios of not less than 2.

The present invention provides a lyotropic liquid crystal composition stably dispersing fine rod-like materials, and the composition can be easily applied to produce various useful optically anisotropic materials through a coating process. Accordingly, the composition is very useful from the industrial viewpoint.

DETAILED DESCRIPTION OF THE INVENTION

Lyotropic Liquid Crystal

Lyotropic liquid crystal comprises a compound that can forms a liquid crystal phase according to an interaction of a solvent (particularly, according to the change of the concentration of the solution).

The lyotropic liquid crystal is described in detail in "Liquid crystal handbook (Ekisho Binran written in Japanese)", Maruzen (2000), Chapters 2 (section 1.2) and 3 (sections 8.3, 8.5 and 9.1 to 9.5). Thermotropic liquid crystal forms a liquid crystal phase of mono-component system according to temperature. On the other hand, the lyotropic liquid crystal forms a liquid crystal phase of multi-component system when dissolved in an solvent.

According to the concentration and the temperature of the solution, the lyotropic liquid crystal generally forms various aggregate structures. It cannot be necessarily determined what phase structure is suitable for anisotropic alignment of rod-like fine materials. However, in many cases, layered lamellar phases or hexagonally aligned rod-like phases are adopted.

In consideration of durability, the anisotropic alignment of the molecules is preferably fixed to maintain the alignment. The lyotropic liquid crystal may be cooled to fix the alignment. However, since the molecules are practically used without solvent, they are preferably fixed by gelation or polymerization.

The method for fixing lyotropic liquid crystal is described in detail in Angewandte Chemie International Edition in English, 27(1988), No. 1, 133 to 158 (Helmut Ringsdorf et al.). In the production process, the liquid crystal molecules are preferably in the form of monomer until the fixing step, and during the fixing step they are preferably polymerized to fix rapidly.

For the polymerization, the lyotropic liquid crystal molecule preferably has a polymerizable group. The polymerizable group preferably is an unsaturated polymerizable group, an epoxy group (Q8) or an aziridinyl group, more preferably is an unsaturated polymerizable group, and most preferably is an ethylenically unsaturated group.

The polymerizable group may connect to the lyotropic liquid crystal molecule not directly but through a linking group, which is preferably —O—, —CO—, an alkylene group or a combination thereof.

The polymerization reaction can be classified into a thermal reaction with a thermal polymerization initiator and a photo reaction with a photo polymerization initiator. A photo polymerization reaction is preferred.

Examples of the photo polymerization initiators include α-carbonyl compounds (described in U.S. Pat. Nos. 2,367,661, 2,367,670), acyloin ethers (described in U.S. Pat. No. 2,448,828), α-hydrocarbon substituted acyloin compounds (described in U.S. Pat. No. 2,722,512), polycyclic quinone compounds (described in U.S. Pat. Nos. 2,951,758, 3,046,127), combinations of triarylimidazoles and p-aminophenyl ketones (described in U.S. Pat. No. 3,549,367), acridine or phenazine compounds (described in Japanese Patent Provisional Publication No. 60(1985)-105667 and U.S. Pat. No. 4,239,850) and oxadiazole compounds (described in U.S. Pat. No. 4,212,970).

The amount of the photo polymerization initiator is preferably in the range of 0.01 to 20 wt. %, and more preferably in the range of 0.5 to 5 wt. % based on the solid content of the coating solution.

The light irradiation for the photo polymerization is preferably conducted with an ultraviolet ray.

The exposure energy is preferably in the range of 20 to 50,000 mJ per $cm^2$, and more preferably in the range of 100 to 800 mJ per $cm^2$. The light irradiation can be conducted while the coated layer is heated to accelerate the photo polymerization reaction.

It is presumed that the peculiar liquid phase structure of multi-component system aligns the molecules when the solution is shared. Further, most lyotropic liquid crystal compounds are such amphiphilic substances that they can serve as surface active agents, and hence they can stably contain dispersed fine grains of micro or nano meter size having large surface energy in the form of solution. Accordingly, lyotropic liquid crystal can be selected properly so that fine optically anisotropic materials may be easily aligned along the sharing direction. The properly selected liquid crystal is presumed to have such proper affinity with the optically anisotropic materials as to balance with aligning power of the liquid crystal when shared.

Examples of the lyotropic liquid crystal compounds are shown below:

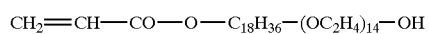

LLC-1

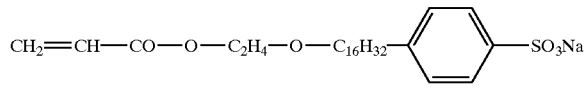

LLC-2

LLC-3

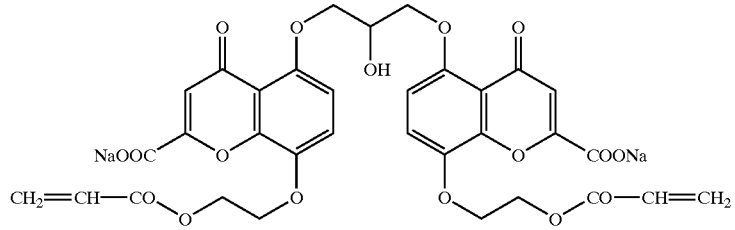

LLC-4

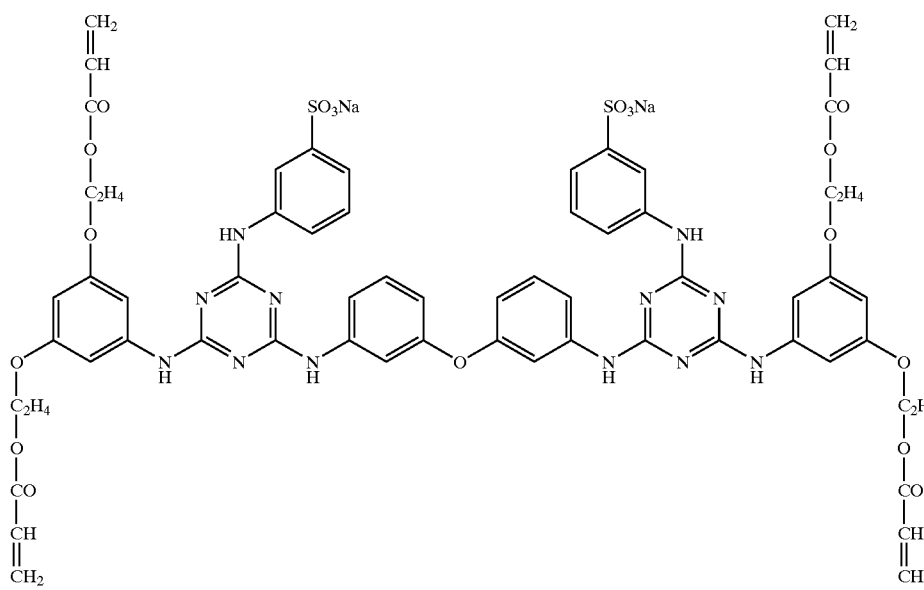

LLC-5

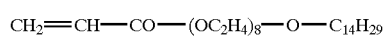

LLC-6

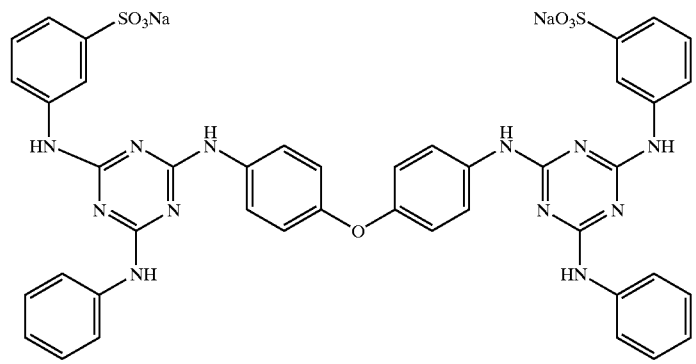

Silver Halide Grains and Silver Grains

The silver halide grains or the silver grains have an aspect ratio (ratio of the major axis to the minor axis) of not less than 2, and preferably not less than 3. The upper limit of aspect ratio is about 300. The aspect ratio is more preferably in the range of 3 to 100, and most preferably in the range of 4 to 80.

The major axis corresponds to the longest edge of a cuboid and the minor axis corresponds to the shortest edge, where the grain is approximated as a cuboid.

A grain having a large aspect ratio generally has a tabular or rod-like shape. If a middle length edge (edge other than the longest and shortest edges) in the approximated cuboid has a length relatively close to the longest edge (i.e., the length of the middle length edge is longer than the mean grain size), the grain has a tabular shape. If the middle length edge has a length relatively close to the shortest edge (i.e., the length of the middle length edge is shorter than the mean grain size), the grain has a rod-like shape. The term "mean grain size" means a radius of a sphere where the grain is approximated as the sphere.

The silver halide grains or the silver grains have a major axis of preferably shorter than 900 nm (namely, in the size of nanometer range), more preferably shorter than 600 nm (shorter than visible wavelength), and most preferably shorter than 300 nm.

The process for forming the tabular grains in gelatin is described in J. Cryst. Growth, 23(1974), 207 (A. Mignot et al.); and U.S. Pat. Nos. 4,434,226, 4,434,520, 4,434,048, 4,386,156, 4,399,215 and 4,400,463.

Japanese Patent Provisional publication No. 63(1988)-271335 describes that the rod-like silver halide grains are preferably prepared in the presence of a crystallization controller. Examples of the crystallization controllers include adenine, guanine, azadenine, azaguanine, adenosine and guanosine.

Halide compositions of silver halide include silver bromide, silver iodobromide and silver iodochlorobromide. The silver halide grain can have homogeneous halide composition. The grain can also have a composite halide structure in which outer composition is different from inner composition. For example, the grain can form a layered (core/shell) structure.

Optically Anisotropic Grains

The optically anisotropic grains can be formed from an inorganic substance, a organic substance or a combination thereof.

A preferred optically anisotropic grain is a carbon nano tube. The carbon nano tube has a size small enough for conditions of a first dimensional substance. The carbon nano tube is expected to have electronic properties different from bulk graphite. The tube has metallic properties or semi-conductor properties, which are determined according to the spiral pitch of the tube. The carbon nano tube is classified into a multi-layered tube (which comprises several ten layers of tubular graphite sheets, and has a diameter of several ten nm) or a mono-layered tube (which comprises one layer of a tubular graphite sheet, and has a diameter of about 1 nm). The tube can be prepared according to an arc discharge method, a hydrocarbon catalytic decomposition method, or a laser evaporation method. The hydrocarbon catalytic decomposition method has recently been developed for a mass production or a direct growth of the tube on a substrate.

Small pores on a porous substance can be used as templates to form fine grains or fine fibers of nano scale. The method of forming fine grains or fine fibers is described in J. H. Fendler, Nanoparticles and Nanostructured Films Chapter. 10 "Template Synthesis of Nanoparticles in Nanoporous Membranes" WILEY-VCH (1998).

Ajayan et al. (Nature vol.375, pp.564(1995) report that a melt oxide of PbO, $Bi_2O_3$ or $V_2O_5$ can be introduced into a carbon nano tube. Green et al. report that a nano wire of a single crystal of $MoO_3$ is synthesized by introducing a melt of molybdenum compound into a carbon nano tube. The obtained wire is reduced with hydrogen to form a nano wire of $MoO_2$, which has interesting electric properties.

Ichikawa et al. (J. Amer. Chem. Soc., vol.18, pp.5,810 (1996)) report that inner wall of pores on zeolite or porous mesocrystalline has OH group, cross-linked oxygen, Al, Si or Na ion. A metal or alloy cluster of several nano size can be formed by using the first dimensional meso pores (20 to 100 Å).

Anodized porous alumina has been known as a surface membrane of aluminum in the field of surface treatment. The porous alumina is formed on a surface of aluminum by anodizing aluminum in an acidic electrolyte. The pores are formed as a honeycomb structure in which lines of the pores are drawn parallel to each other at almost regular intervals. The size, interval and depth of the pores can be controlled relatively freely.

Various metals can be deposited or charged into the pores on an alumina layer according to an electrochemical method. The alumina layer is then selectively dissolved and removed from the metal to form rod-like grains of a micro or nano order used in the present invention.

Carbon nano tube (particularly multi-layered carbon nano tube) is tough and highly electro-conductive. The tubes are dispersed in a thick (about 40 wt. %) solution of lyotropic liquid crystal in water or an organic solvent. The dispersion is subjected to an ultrasonic treatment and a centrifuge treatment repeatedly several times to obtain a paste in which the tubes are well dispersed.

The optically anisotropic grains have an aspect ratio (ratio of the major axis to the minor axis) of not less than 2, and preferably not less than 3. The upper limit of aspect ratio is about 300. The aspect ratio is more preferably in the range of 3 to 100, and most preferably in the range of 4 to 80.

The major axis corresponds to the longest edge of a cuboid and the minor axis corresponds to the shortest edge, where the grain is approximated as a cuboid.

A grain having a large aspect ratio generally has a tabular or rod-like shape. If a middle length edge (edge other than the longest and shortest edges) in the approximated cuboid has a length relatively close to the longest edge (i.e., the length of the middle length edge is longer than the mean grain size), the grain has a tabular shape. If the middle length edge has a length relatively close to the shortest edge (i.e., the length of the middle length edge is shorter than the mean grain size), the grain has a rod-like shape. The term "mean grain size" means a radius of a sphere where the grain is approximated as the sphere.

The optically anisotropic grains have a major axis of preferably shorter than 900 nm (namely, in the size of nanometer range), more preferably shorter than 600 nm (shorter than visible wavelength), and most preferably shorter than 300 nm.

The optically anisotropic grain is not a single molecule, but is an assembly or a polymer of molecules or elements. The optically anisotropic grain itself is not lyotropic liquid crystal. The grain can show optical anisotropy in a lyotropic liquid crystal composition when the composition is aligned (for example by applying a shearing force).

Optically Anisotropic Thin Film

The optically anisotropic thin film comprises lyotropic liquid crystal molecules and silver halide grains, silver grains or optically anisotropic grains. The grains have an aspect ratio of not less than 2. The liquid crystal molecules and the grains are aligned in the film. The optically anisotropic thin film can be prepared from the lyotropic liquid crystal composition in which silver halide grains, silver grains or optically anisotropic grains are dispersed in lyotropic liquid crystal.

The lyotropic liquid crystal composition is coated on a support to prepare the film. The liquid crystal molecules and the grains are aligned by shearing force applied in the coating procedure. If the liquid crystal molecules have polymerizable groups, they are preferably polymerized to fix the alignment after aligning the molecules and the grains.

The silver halide grains in the composition are preferably converted into silver grains in the optically anisotropic film. For example, the grains are reduced into the silver grains having aspect ratios of not less than 2 after aligning the liquid crystal molecules and the silver halide grains.

The silver halide grains are prepared from a silver halide emulsion, which contains gelatin as protective colloid. Accordingly, the lyotropic liquid crystal composition often contains gelatin as well as the silver halide grains. In that case, gelatin is preferably hydrolyzed to remove. The hydrolysis of gelatin can be easily carried out with protease.

Further, the silver halide grains in the silver halide emulsion are preferably settled down by centrifugation to roughly remove the gelatin. The hydrolysis with the enzymes and the centrifugation are preferably carried out in combination.

The most preferred process comprises the steps of: settling down silver halide grains in a silver halide emulsion by centrifugation, dispersing again the silver halide grains in water, adding a lyotropic liquid crystal compound into the dispersion, and removing remaining gelatin by an enzyme to prepare the lyotropic liquid crystal composition.

The optically anisotropic thin film is particularly suitable for a polarizing plate of light-scattering type.

EXAMPLE 1

Preparation of Gelatin Dispersion of Rod-like Silver Halide Grains

Lime-treated gelatin in the amount of 30 g was added to 1,000 mL of distilled water, and dissolved at 40° C. To the solution, 6.5 g of sodium chloride, 0.65 g of sodium hydroxide, 0.02 g of N,N'-dimethylethylenethiourea and 0.27 g of adenine were added. The liquid was heated and kept at 65° C. To the reaction mixture, a solution in which 62.5 g of silver nitrate was dissolved in 750 mL of distilled water and another solution in which 21.9 g of potassium bromide and 10.8 g of sodium chloride were dissolved in 500 mL of water were slowly added for 40 minutes while the solutions were kept at 65° C. The obtained emulsion (EM-1) was observed with an electron microscope, and thereby it was found that the silver halide grains formed in the emulsion were rod-like grains having aspect ratios in the range of 10:1 to 30:1, lengths in the range of 0.3 $\mu$m to 1 $\mu$m and almost uniform thickness of about 30 nm.

Preparation of Lyotropic Liquid Crystal Composition

To 5.0 g of the prepared emulsion (EM-1), 50 ml of distilled water was added. The mixture was heated to 50° C. to dissolve gelatin, and then subjected to centrifugation to settle down the rod-like silver halide grains. After the supernatant was removed, 25 ml of distilled water was added to the settled grains. The grains were then dispersed again by ultrasonic wave. To the dispersion, 2.5 g of lyotropic liquid crystal (LLC-6) was added and dissolved by stirring for 30 minutes. After 25 mg of protease (Actinase E) was added, the liquid was stirred for 6 hours to prepare an aqueous solution (Ag-1) of lyotropic liquid crystal (LLC-6) stably dispersing rod-like silver halide grains.

Preparation of Optically Anisotropic Thin Film

The above-prepared solution (Ag-1) was applied on a glass support at the speed of 50 cm/second by means of a coating wire bar (#23). The formed layer was dried for 15 minutes to form a lyotropic liquid crystal thin film (thickness: 4 $\mu$m) dispersing rod-like silver halide grains (Ag-1/LLC-6).

EXAMPLE 2

Preparation of Lyotropic Liquid Crystal Composition

In 10 mL of distilled water, 5.0 g of the emulsion (EM-1) prepared in Example 1 and 0.1 g of lyotropic liquid crystal (LLC-1) were added and dissolved by stirring for 30 minutes at room temperature. While the solution was heated and kept at 40° C., 1.3 mg of protease (Actinase E) was added and stirred for 3 hours. The solution was subjected to centrifugation to obtain a concentrated silver halide suspension. The suspension was dispersed in a 40% aqueous solution of lyotropic liquid crystal (LLC-1), and the dispersion was subjected to centrifugation. These dispersing and centrifuging processes were repeated five times to prepare a 40% aqueous solution (Ag-1) of lyotropic liquid crystal (LLC-1) stably dispersing rod-like silver halide grains.

Preparation of Optically Anisotropic Thin Film

Immediately after a photopolymerization initiator (Irgacure 907) was added to the above-prepared solution (Ag-1) in the amount of 2 wt. %, the solution was applied on a glass support at the speed of 50 cm/second by means of a coating wire bar (#23). The formed layer was immediately exposed to ultraviolet rays for 10 seconds, and dried for 15 minutes to form a lyotropic liquid crystal thin film (thickness: 6.5 $\mu$m) dispersing rod-like silver halide grains (Ag-1/LLC-1).

EXAMPLE 3

Preparation of Gelatin Dispersion Containing Tabular Silver Halide Grains

The following solutions A to D were prepared.

| Composition of solution A | |
| --- | --- |
| Ossein gelatin | 60.2 g |
| Distilled water | 20,000 ml |
| 10 Wt. % ethanol solution of polyisopropyleneoxy-polyethyleneoxy-sodium salt of disuccinic ester | 5.6 ml |
| KBr | 26.8 g |
| 10 Wt. % $H_2SO_4$ | 144 ml |

| Composition of solution B | |
| --- | --- |
| $AgNO_3$ | 1,487.5 g |
| Distilled water (to make up to) | 3,500 ml |

| Composition of solution C | |
| --- | --- |
| KBr | 1,029 g |
| KI | 29.3 g |
| Distilled water (to make up to) | 3,500 ml |

| Composition of solution D |
| --- |
| 1.75 N KBr aqueous solution to give the following silver potential |

To the solution A, the solutions B and C in each amount of 64.1 ml were added at 35° C. for 2 minutes according to the simultaneous mixing method by means of a mixer described in Japanese Patent Publication Nos. 58(1983)-58288 and 58(1983)-58289, to form nuclei.

After the addition of the solutions B and C was completed, the reaction liquid was gradually heated to 60° C. for 60 minutes. While the temperature was kept at 60° C., the solutions B and C were further added in each flow rate of 68.5 ml/minute for 50 minutes according to the simultaneous mixing method. During this process, the silver potential (measured with a silver ion selective electrode based on a comparison electrode of saturated silver-silver chloride electrode) was controlled to be +6 mV with the solution D. After the addition was completed, the pH was adjusted at 6 with 3% KOH. Immediately, the liquid was desalted and washed to prepare a seed emulsion EM-0. The silver halide grains in the seed emulsion EM-0 were observed with an electron microscope, and thereby it was found that more than 90% of the total projected area was attributed to hexagonal tabular grains having a maximum neighboring ratio of 1.0 to 2.0. Further, it was also found that the hexagonal tabular grains had a thickness of 0.07 $\mu$m and an average diameter (when the hexagonal face was approximated as a circle) of 0.5 $\mu$m.

Preparation of Tabular Grain Emulsion

From the following four solutions, a tabular silver iodobromide emulsion (EM-2) containing AgI in the amount of 1.53 mol. % was prepared.

| Composition of solution A | |
| --- | --- |
| Ossein gelatin | 29.4 g |
| 10 Wt. % ethanol solution of polyisopropyleneoxy-polyethyleneoxy-sodium salt of disuccinic ester | 2.5 ml |
| Seed emulsion of EM-0 (in terms of silver halide) | 0.588 mol |
| Distilled water (to make up to)) | 1,400 ml |

| Composition of solution B | |
| --- | --- |
| AgNO$_3$ | 1,404.2 g |
| Distilled water (to make up to) | 2,360 ml |

| Composition of solution C | |
| --- | --- |
| KBr | 963 g |
| KI | 27.4 g |
| Distilled water (to make up to) | 2,360 ml |

| Composition of solution D |
| --- |
| 1.75 N KBr aqueous solution to give the following silver potential |

To the solution A, all of the solutions B and C were added at 60° C. at the flow rate of 21.26 ml/minutes for 111 minutes according to the simultaneous mixing method by means of a mixer described in Japanese Patent Publication Nos. 58(1983)-58288 and 58(1983)-58289, to grow the crystals. During this procedure, the silver potential was controlled to be +25 mV with the solution D. After the addition was completed, the following sensitizing dyes (A) and (B) were added in the amounts of 200 mg and 15 mg based on 1 mol of Ag, respectively. The solution was desalted with an aqueous solution of Demole N (Kao Atlas Co., Ltd.) and a magnesium sulfate aqueous solution to remove excess salts, and a gelatin solution containing 92.2 g of ossein gelatin was added. The mixture was stirred to disperse again to prepare an emulsion EM-2.

The silver halide grains (in the middle of about 3,000 grains) in the emulsion EM-2 were observed with an electron microscope, and thereby it was found that the grains were hexagonal tabular grains having an average thickness of 0.25 $\mu$m and an average diameter of 1.05 $\mu$m. The distribution width of the grains was also found 18%.

Preparation of Lyotropic Liquid Crystal Composition

To 5.0 g of the above-prepared emulsion (EM-2), 50 ml of distilled water was added. The mixture was heated to 50° C. to dissolve gelatin, and then subjected to centrifugation to settle down the tabular silver halide grains. After the supernatant was removed, 25 ml of distilled water was added to the settled grains. The grains were then dispersed again by ultrasonic wave. To the dispersion, 2.5 g of lyotropic liquid crystal (LLC-6) was added and dissolved by stirring at room temperature for 30 minutes. After 25 mg of protease enzyme (Actinase E) was added, the liquid was stirred for 6 hours to prepare an aqueous solution (Ag-2) of lyotropic liquid crystal (LLC-6) stably dispersing tabular silver halide grains.

Preparation of Optically Anisotropic Thin Film

The above-prepared solution (Ag-2) was applied on a glass support at the speed of 50 cm/second by means of a coating wire bar (#23). The formed layer was dried for 15 minutes to form a lyotropic liquid crystal thin film (thickness: 4 $\mu$m) dispersing rod-like silver halide grains (Ag-2/LLC-6).

EXAMPLE 4

Preparation of Lyotropic Liquid Crystal Composition

In 10 mL of distilled water, 5.0 g of the emulsion (EM-2) prepared in Example 3 and 0.1 g of lyotropic liquid crystal (LLC-1) were added and dissolved by stirring for 30 minutes at room temperature. While the solution was heated and kept at 40° C., 1.3 mg of protease (Actinase E) was added and stirred for 3 hours. The solution was subjected to centrifugation to obtain a concentrated silver halide suspension. The suspension was dispersed in a 40% aqueous solution of lyotropic liquid crystal (LLC-1), and the dispersion was subjected to centrifugation. These dispersing and centrifuging processes were repeated five times to prepare a 40% aqueous solution (Ag-2) of lyotropic liquid crystal (LLC-1) stably dispersing tabular silver halide grains in the amount of 10 wt. %.

Preparation of Optically Anisotropic Thin Film

Immediately after a photopolymerization initiator (Irgacure 907) was added to the above-prepared solution (Ag-1) in the amount of 2 wt. %, the solution was applied on a glass support at the speed of 50 cm/second by means of a coating wire bar (#23). The formed layer was immediately exposed to ultraviolet rays for 10 seconds, and dried for 15 minutes to form a lyotropic liquid crystal thin film (thickness: 6.5 µm) dispersing tabular silver halide grains (Ag-$^2$/LLC-1).

Evaluation as Polarizing Film of Light-Scattering Type

1. Transmittance and scattering (haze)

With respect to transmittance and scattering (haze), each film of Examples 1 to 4 (Ag-1/LLC-6, Ag-1/LLC-1, Ag-2/LLC-6 and Ag-2/LLC-1) was evaluated by means of a haze mater (MODEL 1001DP, Nippon Denshoku Kogyo Co., Ltd.). A polarizer was placed between a light source and the sample film, and the total transmittance and the haze were observed when the transparent axes of the polarizer and the film were placed parallel or perpendicularly to each other. The transmittance and the scattering were evaluated on the basis of the total transmittance and the haze, respectively. If the film has polarizability, a high transmittance and a low haze are observed in the parallel arrangement, as compared with in the perpendicular arrangement.

2. Surface

Each film of Examples 1 to 4 (Ag-1/LLC-6, Ag-1/LLC-1, Ag-2/LLC-6 and Ag-2/LLC-1) was sandwiched between two polarizing plates perpendicularly placed (their transparent axes were perpendicularly crossed), and the surface of the film was observed while the film was rotated between the polarizing plates.

The results were set forth in Table 1. Each film of Examples 1 to 4 (Ag-1/LLC-6, Ag-1/LLC-1, Ag-2/LLC-6 and Ag-2/LLC-1) has an excellent function as a polarizer. The films improve the efficiency of light when used in a liquid crystal display.

TABLE 1

| Film | Transmittance | | Haze | | Surface | |
|---|---|---|---|---|---|---|
| | Parallel | Perpendicular | Parallel | Perpendicular | Condition | Color |
| Ex. 1 | 78.8 | 56.3 | 8.8 | 33.5 | Uniform | Slightly bluish |
| Ex. 2 | 80.3 | 56.3 | 9.2 | 35.1 | Uniform | Slightly bluish |
| Ex. 3 | 70.2 | 39.3 | 10.0 | 37.8 | Uniform | Slightly bluish |
| Ex. 4 | 7.23 | 39.3 | 9.9 | 37.2 | Uniform | Slightly bluish |

EXAMPLE 5

From the polarizing films of Examples 2 and 4 (Ag-1/LLC-1 and Ag-2/LLC-1), polarizing plates of light-scattering type were produced. The produced plates and a conventional polarizing plate for comparison were placed on an aluminum reflection board so that the polarizing layer of each plate might be on the side of the reflection board. The surface of the reflection board was more brightly seen through the produced plates than through the conventional plate. This indicates that the plates of the invention improve the efficiency of light. Light reflected on the board passes through the plate in an amount of the component parallel to the transparent axis. Besides that, the component scattered by the polarizing plate of the invention is reflected again on the board, and then reenters the plate to increase the total amount of light passing through the plate. The plates of the invention are though to thus improve the efficiency of light.

EXAMPLE 6

Insertion of Gold into Nano Pores of Alumina

Porous alumina was prepared by anodizing aluminum. The porous alumina film had the thickness of 1.5 µm. The average number of the pores was $8 \times 10^{14}$ per 1 m2 of the film. The inner diameter of the pore was 12 nm. The aluminum oxide can be dissolved to change the inner diameter. A trace amount of copper as precipitated in the pores to accelerate precipitation of gold. The copper can be selectively dissolved to facilitate separation of gold form the film. The length of the gold rod can be changed according to the time for precipitation. The time was adjusted to obtain rod-like gold grains having the length of 240 nm.

Preparation of Etching Solution

The following etching solution was prepared. The etching solution was diluted 100 times before use.

| Composition of etching solution | |
|---|---|
| 98 Wt. % sulfuric acid | 25 ml |
| 30 Wt. % hydrogen peroxide | 175 ml |
| 85 Wt. % $H_3PO_4$ | several drops |
| Distilled water (to make up to)) | 1,000 ml |

Preparation of Lyotropic Liquid Crystal Composition

Lyotropic liquid crystal (LLC-1) was dissolved in 1.25 M aqueous solution of sodium hydroxide to form 20 wt. % solution. The alumina thin film having pores to which gold rods were inserted was immersed in the solution to dissolve the alumina. The gold rods were separated from the alumina film.

The obtained gold rod paste was dispersed in the diluted etching solution, and left for 30 minutes.

The dispersion was centrifuged. The condensed gold rod suspension was dispersed in 40 wt. % aqueous solution of lyotropic liquid crystal (LLC-1). The centrifuging step and the dispersing step were repeated five times to prepare 40 wt. % aqueous solution of lyotropic liquid crystal (LLC-1) in which fine gold rods were dispersed in a stable state (Au-1).

Preparation of Optically Anisotropic Thin Film

To the composition (Au-1), a photopolymerization initiator (Irgacure 907) was added in the amount of 2 wt. % of the composition. The mixture was immediately coated on a glass plate at a coating rate of 50 cm per second by using a coating wire bar of #23. The coated layer was irradiated with ultraviolet ray for 10 seconds. The layer was dried for 15 minutes to form an optically anisotropic thin film of lyotropic liquid crystal in which gold rods were dispersed (Au-1/LLC-1). The thickness of the film was 1.5 μm.

Evaluation as Polarizing Film

The loss of the polarized light transmitted through the obtained film was measured. The results are set forth in Table 2.

In Table 2, the line of "Parallel" indicates that a large polarizing property of about 30 dB was observed in the measured wavelength range. At the wavelength of 1.3 μm, a large polarizing property was observed, in which the loss of the transmitted light polarized parallel wad 32 dB, while the loss of the transmitted light polarized perpendicular was 2 dB.

TABLE 2

| Loss of transmitted light | Wavelength (nm) | | | | |
|---|---|---|---|---|---|
| | 610 | 820 | 1,150 | 1,300 | 1,550 |
| Parallel | 27 dB | 28 dB | 30 dB | 32 dB | 29 dB |
| Perpendicular | 7 dB | 5 dB | 3 dB | 2 dB | 1 dB |

We claim:

1. A lyotropic liquid crystal composition comprising silver halide grains or silver grains dispersed in lyotropic liquid crystal, said grains having an aspect ratio of not less than 2.

2. The lyotropic liquid crystal composition as defined in claim 1, wherein the silver halide grains or the silver grains have a major axis of not longer than 900 nm.

3. The lyotropic liquid crystal composition as defined in claim 2, wherein the silver halide grains or the silver grains have a major axis of not longer than 600 nm.

4. The lyotropic liquid crystal composition as defined in claim 3, wherein the silver halide grains or the silver grains have a major axis of not longer than 300 nm.

5. The lyotropic liquid crystal composition as defined in claim 1, wherein the silver halide grains or the silver grains have an aspect ratio of not less than 3.

6. The lyotropic liquid crystal composition as defined in claim 1, wherein the silver halide grains or the silver grains have a rod-like shape.

7. The lyotropic liquid crystal composition as defined in claim 1, wherein the silver halide grains or the silver grains have a tabular shape.

8. A process for preparation of a lyotropic liquid crystal composition, which comprises the steps of: precipitating silver halide grains from a silver halide emulsion by centrifugation; dispersing again the silver halide grains in water; adding lyotropic liquid crystal into the dispersion; and removing remaining gelatin with an enzyme.

9. An optically anisotropic thin film comprising lyotropic liquid crystal molecules and silver halide grains or silver grains, said grains having an aspect ratio of not less than 2, wherein the lyotropic liquid crystal molecules and said grains are aligned.

10. A process for preparation of an optically anisotropic thin film, which comprises coating a lyotropic liquid crystal composition comprising silver halide grains or silver grains dispersed in lyotropic liquid crystal on a support to align the lyotropic liquid crystal and the grains by shearing force applied in a coating procedure, said grains having an aspect ratios of not less than 2.

11. The process as defined in claim 10, wherein the process further comprises polymerizing lyotropic liquid crystal to fix alignment of the lyotropic liquid crystal and the grains after aligning the lyotropic liquid crystal and the grains.

12. The process as defined in claim 10, wherein the lyotropic liquid crystal composition comprises the silver halide grains having an aspect ratio of not less than 2, and the process further comprises reducing the silver halide grains to form silver grains having an aspect ratio of not less than 2 after aligning the lyotropic liquid crystal and the silver halide grains.

13. The process as defined in claim 10, wherein the lyotropic liquid crystal composition comprises gelatin and the silver halide grains having an aspect ratio of not less than 2, and the process further comprises hydrolyzing the gelatin before coating the composition.

14. A lyotropic liquid crystal composition comprising optically anisotropic grains dispersed in lyotropic liquid crystal, said grains having an aspect ratio of not less than 2.

15. The lyotropic liquid crystal composition as defined in claim 14, wherein the optically anisotropic grains have a major axis of not longer than 900 nm.

16. The lyotropic liquid crystal composition as defined in claim 15, wherein the optically anisotropic grains have a major axis of not longer than 600 nm.

17. The lyotropic liquid crystal composition as defined in claim 16, wherein the optically anisotropic grains have a major axis of not longer than 300 nm.

18. The lyotropic liquid crystal composition as defined in claim 14, wherein the optically anisotropic grains have an aspect ratio of not less than 3.

19. The lyotropic liquid crystal composition as defined in claim 14, wherein the optically anisotropic grains have a rod-like shape.

20. An optically anisotropic thin film comprising lyotropic liquid crystal molecules and optically anisotropic grains, said grains having an aspect ratio of not less than 2, wherein the lyotropic liquid crystal molecules and said grains are aligned.

21. A process for preparation of an optically anisotropic thin film, which comprises coating a lyotropic liquid crystal composition comprising optically anisotropic grains dispersed in lyotropic liquid crystal on a support to align the lyotropic liquid crystal and the grains by shearing force applied in a coating procedure, said grains having an aspect ratios of not less than 2.

22. The process as defined in claim 21, wherein the process further comprises polymerizing lyotropic liquid crystal to fix alignment of the lyotropic liquid crystal and the grains after aligning the lyotropic liquid crystal and the grains.

* * * * *